US007877107B2

(12) United States Patent
Joung

(10) Patent No.: US 7,877,107 B2
(45) Date of Patent: Jan. 25, 2011

(54) METHOD FOR TRANSMITTING MESSAGE DURING PTT CALL SERVICE IN MOBILE COMMUNICATION TERMINAL

(75) Inventor: Ou-Jin Joung, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 1014 days.

(21) Appl. No.: 11/297,743

(22) Filed: Dec. 8, 2005

(65) Prior Publication Data

US 2006/0121927 A1 Jun. 8, 2006

(30) Foreign Application Priority Data

Dec. 8, 2004 (KR) ...................... 10-2004-0102933

(51) Int. Cl.
*H04B 7/00* (2006.01)
(52) U.S. Cl. ...................... 455/518; 455/517; 455/519; 455/412.1; 455/420
(58) Field of Classification Search ................ 455/90.2, 455/412.1, 414.1, 517–520, 78, 79, 426.1, 455/422.1, 416, 420; 370/352, 389, 338, 370/325
See application file for complete search history.

(56) References Cited

U.S. PATENT DOCUMENTS

| | | | | |
|---|---|---|---|---|
| 6,097,961 A * | 8/2000 | Alanara et al. | ............... | 455/466 |
| 6,161,020 A * | 12/2000 | Kim | ............ | 455/466 |
| 6,556,817 B1 * | 4/2003 | Souissi et al. | ............... | 455/406 |
| 7,082,313 B2 * | 7/2006 | Sabo et al. | .................. | 455/466 |
| 7,139,586 B2 * | 11/2006 | Kreitzer et al. | ............. | 455/518 |
| 7,321,779 B2 * | 1/2008 | Kang | ......................... | 455/466 |
| 2003/0100321 A1 * | 5/2003 | Rao et al. | ................... | 455/466 |
| 2004/0121791 A1 * | 6/2004 | May et al. | .................... | 455/519 |
| 2004/0249949 A1 * | 12/2004 | Gourraud et al. | ............ | 709/227 |
| 2005/0043024 A1 * | 2/2005 | Shiga | ........................ | 455/428 |
| 2005/0202836 A1 * | 9/2005 | Schaedler et al. | ........... | 455/466 |
| 2005/0250476 A1 * | 11/2005 | Worger et al. | ............ | 455/412.1 |
| 2006/0009249 A1 * | 1/2006 | Fu et al. | ..................... | 455/518 |
| 2006/0010395 A1 * | 1/2006 | Aaltonen | .................... | 715/779 |
| 2006/0046758 A1 * | 3/2006 | Emami-Nouri et al. | ..... | 455/518 |
| 2006/0073843 A1 * | 4/2006 | Aerrabotu et al. | ........... | 455/519 |
| 2006/0120308 A1 * | 6/2006 | Forbes et al. | .............. | 370/260 |
| 2008/0019496 A1 * | 1/2008 | Taschereau | ............ | 379/218.01 |

* cited by examiner

*Primary Examiner*—Dominic E Rego
(74) *Attorney, Agent, or Firm*—The Farrell Law Firm, LLP

(57) ABSTRACT

Disclosed is a method for transmitting a message during a PTT call service in a mobile communication terminal. The method includes checking whether a message transmission key is input during a PTT call service; when the message transmission key is input, displaying a screen containing a plurality of preset messages; when one message is selected, creating an SMS message using the selected message and transmitting the created SMS message to a pre-selected participant; and when a direct message creation is selected, receiving a selection of a participant to whom a message is to be transmitted, receiving an input message, creating an SMS message using the input message, and transmitting the created SMS message to the selected participant. Accordingly, even a participant having no right to speak can inform other participants of his or her own state.

6 Claims, 4 Drawing Sheets

METHOD FOR TRANSMITTING MESSAGE DURING PTT CALL SERVICE IN MOBILE COMMUNICATION TERMINAL

PRIORITY

This application claims priority under 35 U.S.C. §119 to an application entitled "Method For Transmitting SMS During Call Service In Mobile Communication Terminal" filed in the Korean Intellectual Property Office on Dec. 8, 2004 and assigned Serial No. 2004-102933, the contents of which are incorporated herein by reference.

BACKGROUND OF THE INVENTION

1. Field of the Invention

The present invention relates to a PTT (Push To Talk) call service method for a mobile communication terminal, and more particularly, to a method for transmitting an SMS message to other participants during a PTT call service.

2. Background of the Prior Art

Mobile communication systems can be classified into audio service systems and data service systems according to their utilization. A representative example of a mobile communication system is a Code Division Multiple Access (CDMA) system. In the CDMA system, an International Standard (IS-95) system supports only an audio service. With recent developments in communication technology, mobile communication systems have made progress toward a high-speed data service. For example, a CDMA2000 1x system supports both an audio service and a high-speed data service. Mobile communication systems are also developing toward a multimedia service and a Push To Talk (PTT) service, as well as a regular one-to-one voice communication.

In using the PTT service, a user logs in and selects a group or a member who he or she wants to communicate with among groups of co-workers or friends or others displayed on a display. Then, the user requests and initiates a PTT call service. After a one-to-one or intergroup communication path is set on a network that can provide the PTT service, the call can be in service through the set communication path. Specifically, unlike a general phone, the PTT service can directly provide a call service by pressing a PTT button. Further, since a group call with more than three participants is possible, the user can economically benefit from it.

A PTT service using a Session Initiation Protocol (SIP) in the mobile communication system is called a Push to Talk over Cellular (POC). Hereinafter, the POC service and the PTT service will be used interchangeably.

FIG. 1 is a block diagram of a network configuration that provides a POC service in a mobile communication system. The network configuration includes a User Agent (UA) 10 for supporting a POC service and providing wireless access based on a CDMA2000 1x standard, a CDMA2000 1x Access Network (AN) 20 for transmitting/receiving packets to/from the UA 10 over a wireless channel, a Packet Data Service Node (PDSN) 30 for connecting the AN 20 with an Internet Protocol (IP) network 40 using an IP, and a POC server 50 connected to the IP network 40 to manage a POC session and relay a packet from a person talking to a plurality of listeners.

In such a POC service network, an SIP may be used as a POC service protocol for a signaling transmission. A Real-time Transport Protocol (RTP) may be used for real-time packet transmission. The SIP is an end-to-end and server-client signaling protocol, and exchanges necessary session information before a call starts, and removes session information after the call ends.

As described above, the POC service has an advantage in that voice data can be transmitted to a plurality of UAs at the same time, but has a disadvantage in that only one person can speak at a time, such that any person, except the person talking, trying to speak cannot even in an urgent situation. The reason is that unlike a general phone service the PTT service provides only a one-way communication.

SUMMARY OF THE INVENTION

The present invention provides a method for informing other participants of an urgent situation during a PTT call service in a mobile communication terminal.

Also, the present invention provides a method for transmitting an SMS message to other participants during a PTT call service in a mobile communication terminal.

According to an aspect of the present invention, there is provided a method for transmitting a message during a PTT (Push To Talk) call service in a mobile communication terminal, the method including checking whether a message transmission key is input during a PTT call mode; and when the message transmission key is input, transmitting a previously stored message to all participants or a specific participant using an SMS (Short Message Service).

According to another aspect of the present invention, there is provided a method for transmitting a message during a PTT call service in a mobile communication terminal, the method including displaying a soft key on a screen so as to select a message transmission during a PTT call service; when the soft key is input, displaying a list of preset messages; and when one message is selected from the list, creating an SMS message using the selected message and transmitting the created SMS message to a pre-selected participant.

According to a further another aspect of the present invention, there is provided a method for transmitting a message during a PTT call service in a mobile communication terminal, the method including displaying a soft key on a screen so as to select a message transmission during a PTT call service; when the soft key is input, checking whether a participant to whom a message is to be transmitted is selected; when the participant is selected, receiving a selection of a message; and when the input of the message is completed, creating an SMS message using the input message and transmitting the created SMS message to the selected participant.

According to a still further another aspect of the present invention, there is provided a method for transmitting a message during a PTT call service in a mobile communication terminal, the method including checking whether a message transmission key is input during a PTT call service; when the message transmission key is input, displaying a screen containing a plurality of preset messages; when one message is selected, creating an SMS message using the selected message and transmitting the created SMS message to a pre-selected participant; and when a direct message creation is selected, receiving a selection of a participant to whom a message is to be transmitted, receiving an input message, creating an SMS message using the input message, and transmitting the created SMS message to the selected participant.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detail description of well-known features will be omitted for conciseness.

Hereinafter, a method for transmitting a Short Message Service (SMS) message to a person talking or all participants during a PTT call service on an urgent business in a mobile communication terminal will be described in detail. During the PTT call service, phone numbers of the person talking or all participants can be checked in real time. If an urgent situation occurs to the person having the right to speak, a previously stored text (for example, "I have to leave for other business") can be transmitted to other participants using the SMS.

Figure 1:
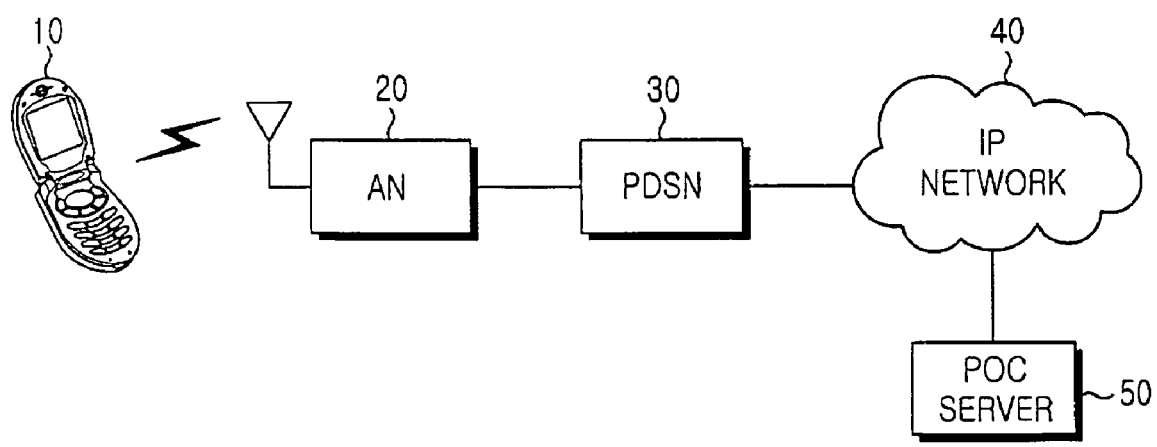
FIG. 1 is a block diagram of a network configuration for providing a POC service in a mobile communication system.
Figure 2:
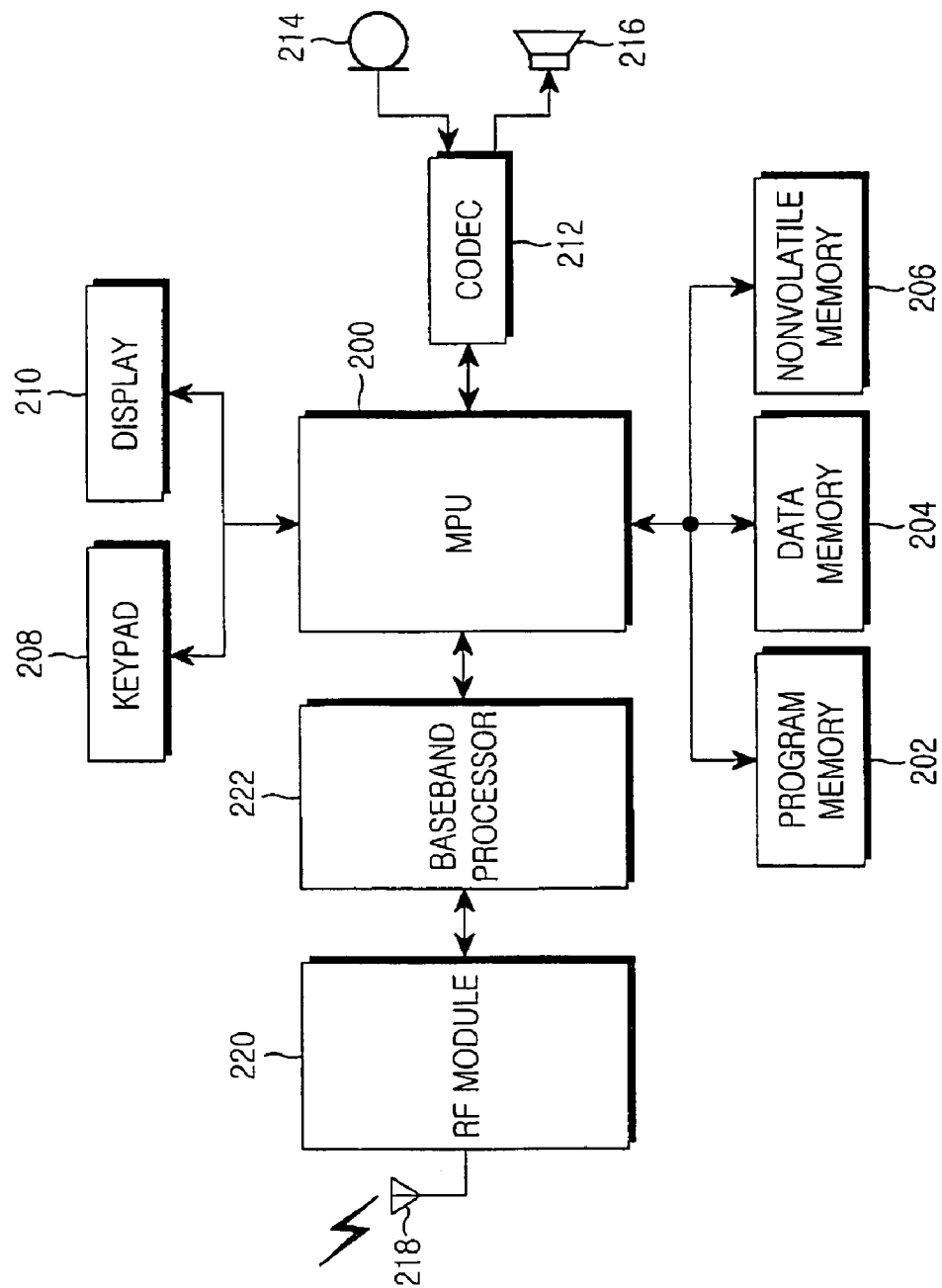
FIG. 2 is a block diagram of a mobile communication terminal according to an embodiment of the present invention.

FIG. 2 is a block diagram of a mobile communication terminal according to an embodiment of the present invention. It is assumed that the mobile communication terminal is a terminal that supports a PTT service and provides wireless access based on a CDMA2000 1x standard.

Referring to FIG. 2, a microprocessor unit (MPU) 200 controls an overall operation of the mobile communication terminal. For example, the MPU 200 processes and controls voice communication and data communication. In addition to the typical functions, the MPU 200 supports a PTT service and processes a function of transmitting an SMS message to other participants during a PTT call service. A description about the typical process and control operations of the MPU 200 will be omitted.

A program memory 202, a data memory 204 and a nonvolatile memory 206 are included. Although shown separately, these memories obviously can be a single unit. The program memory 202 stores a program for controlling an overall operation of the mobile communication terminal. A flash memory may be used for the program memory 202. The data memory 204 temporarily stores data that is created during the operation of the mobile communication terminal. A Random Access Memory (RAM) may be used for the data memory 204. The nonvolatile memory 206 stores system parameters and other data (e.g., phone number and SMS message). An Electrically Erasable and Programmable Read Only Memory (EEPROM) may be used for the nonvolatile memory 206. In this embodiment, the memory stores SMS messages (e.g., "I have to leave for other business") that will be transmitted to other participants during a PTT call service on an urgent business.

A keypad 208 includes numeric keys of digits 0-9 and a plurality of function keys, such as a Menu key, a Cancel (Delete) key, a Conformation key, a Talk key, an End key, an Internet connection key, and Navigation keys (Left/Right/Up/Down). A key input data corresponding to a key pressed by the user is transferred to the MPU 200. Also, a side key for the PTT call service is preferably provided on a main body of the mobile terminal, for example on the left side of the terminal. A display 210 displays status information (or indicator) of the mobile communication terminal, numerals and characters, moving pictures and still pictures, and the like. A color Liquid Crystal Display (LCD) may be used for the display 210.

A coder-decoder (CODEC) 212 connected to the MPU 200, a speaker 216 and a microphone 214 connected to the CODEC 212 are an audio input/output block that is used for a phone call. The MPU 200 produces pulse code modulated (PCM) data and the CODEC 212 converts the PCM data into analog audio signals. The analog audio signals are output through the speaker 216. Also, the CODEC 212 converts audio signals received through the microphone 214 into PCM data and provides the PCM data to the MPU 200.

A Radio Frequency (RF) module 220 down-converts RF signals received through an antenna 218 and provides the down-converted signal to a baseband processor 222. Also, the RF module 220 up-converts a baseband signal provided from the baseband processor 222 and transmits the up-converted baseband signal through the antenna 218. The baseband processor 222 processes the baseband signals that are transmitted/received between the RF module 220 and the MPU 200. For example, in the case of the data transmission, the baseband processor 222 performs channel coding and spreading on the transmit data according to a corresponding radio access standard (e.g., CDMA2000 1x). In the case of the data reception, the baseband processor 222 performs despreading and channel decoding on the received data.

Figure 3:
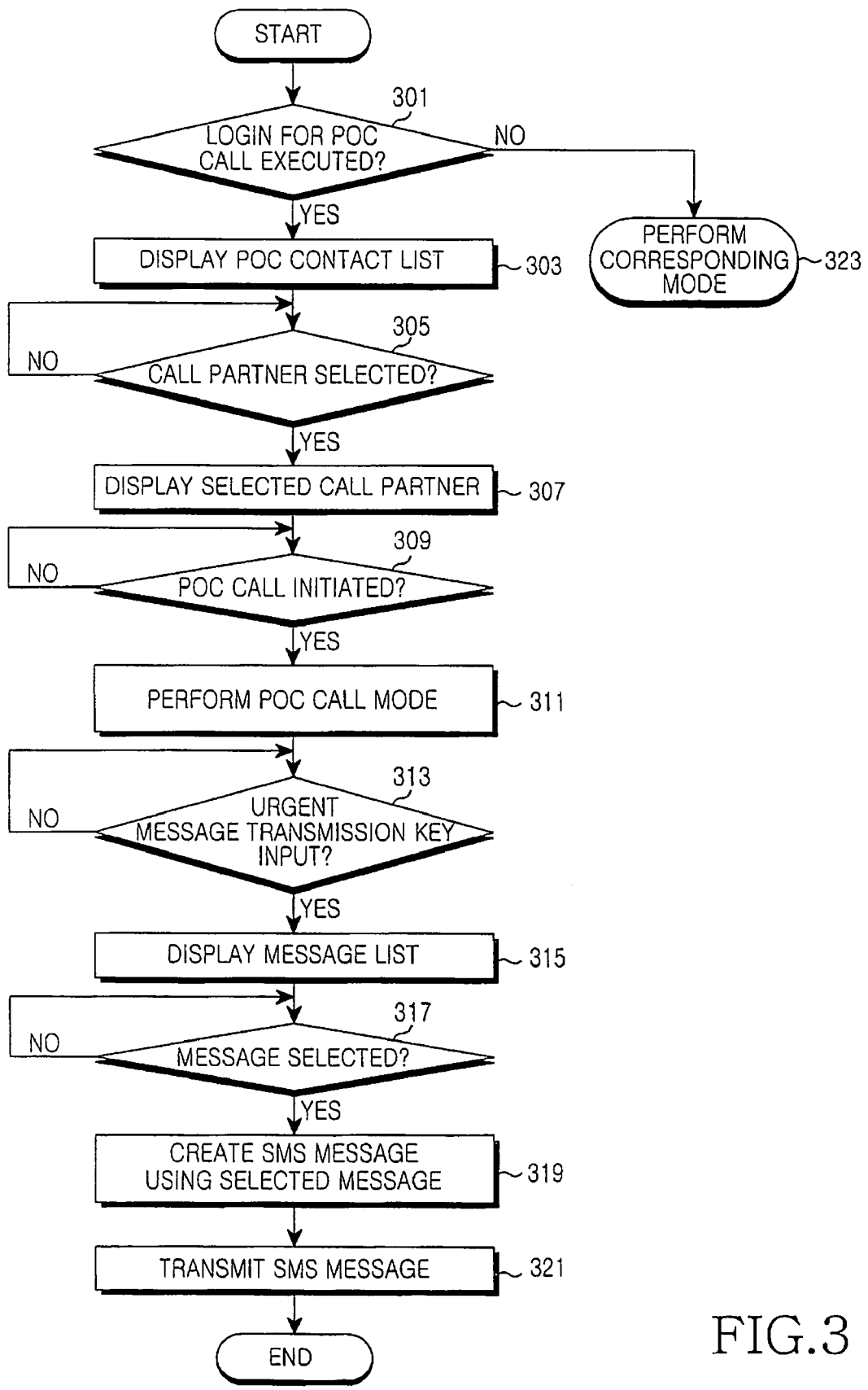
FIG. 3 is a flowchart illustrating a method for transmitting an SMS message during a POC call in a mobile communication terminal according to a first embodiment of the present invention.

FIG. 3 is a flowchart illustrating a method for transmitting an SMS message during a POC call according to an embodiment of the present invention. In step 301, the MPU 200 checks whether a login for a POC call is executed. In step 323, when the login for the POC call is not executed, the MPU 200 performs a corresponding mode (e.g., a waiting mode).

In step 303, when the login for the POC call is executed, the MPU 200 receives a POC contact list previously registered by a user from a network (or a POC server) and displays it. The POC contact list is a list of PTT call partners, and a current state (login or logout) of each call partner is displayed.

In step 305, after displaying the POC contact list, the MPU 200 checks whether a call partner is selected by the user. The user can select a group for a group call or one partner for a one-to-one call. Hereinafter, it is assumed that the group call is selected. In step 307, when the call partner is selected, the MPU 200 displays the selected call partners (members of the selected group).

In step 309, the MPU 200 checks whether the POC call is initiated. The POC call initiation can be detected by a user's press of the POC button. In step 311, when the POC call is initiated, the MPU performs a POC call mode. During the POC call mode, the mobile communication terminal can operate as a talker having a right to speak or a listener having no right to speak.

In step 313, the MPU 200 checks whether an urgent message transmission key is inputted during the POC call mode. The urgent message transmission key can be implemented with a soft key that is displayed on a screen. In step 315, when the urgent message transmission key is inputted, the MPU 200 displays a message list that is previously stored in the memory. For example, the message list can be given as Table 1 below.

TABLE 1

| | |
|---|---|
| 1: | (All members) Urgent. Please give me a right to speak! |
| 2: | (All members) I have to leave for other business. |
| 3: | (To: A member having a right to speak) Urgent. Please give me a right to speak! |
| 4: | (To: A member having a right to speak) I have to leave for other business. |
| 5: | (To: A group call establisher) I have to leave for other business. |

The above Table 1 shows the message list in the case of the group call. In the case of the one-to-one call, message No. 3 or 4 may be displayed.

In step 317, in such a state that the message list is displayed, the MPU 200 checks whether a message is selected from the message list by the user. In step 319, when the message is selected, the MPU 200 creates an SMS message using the selected message. In step 321, the MPU 200 transmits the created SMS message to the corresponding call partner. If a current traffic channel is allocated, the SMS message is transmitted over the corresponding traffic channel. On the contrary, if the traffic channel is in a dormant state, the SMS message can be transmitted over a common channel such as an access channel.

Figure 4:
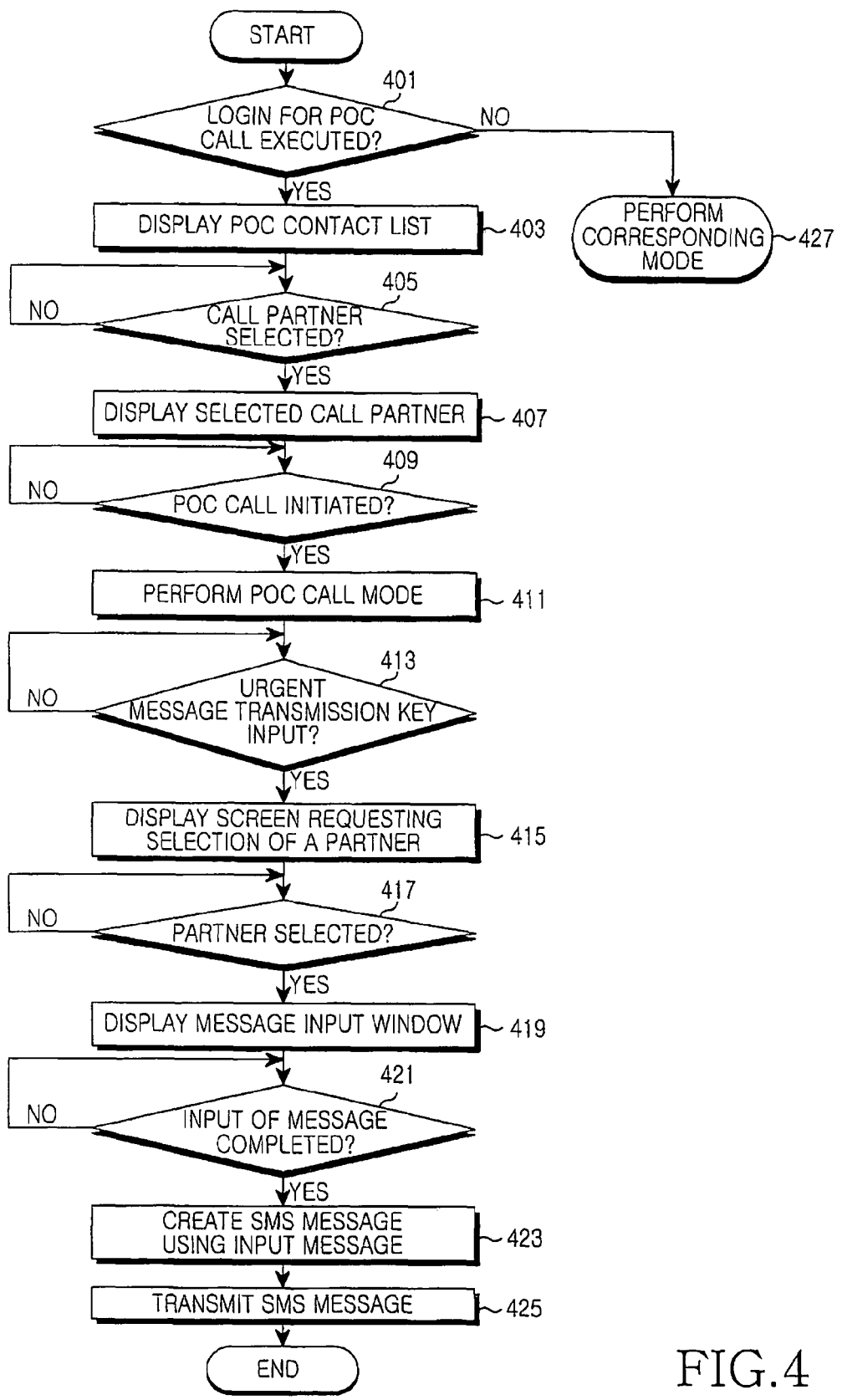
FIG. 4 is a flowchart illustrating a method for transmitting an SMS message during a POC call in a mobile communication terminal according to a second embodiment of the present invention.

FIG. 4 is a flowchart illustrating a method for transmitting an SMS message during a POC call according to another embodiment of the present invention. In step 401, the MPU 200 checks whether a login for a POC call is executed. In step 427, when the login for the POC call is not executed, the MPU 200 performs a corresponding mode (e.g., a waiting mode).

In step 403, when the login for the POC call is executed, the MPU 200 receives a POC contact list previously registered by a user from a network (or a POC server) and displays it. The POC contact list is a list of PTT call partners and a current state (login or logout) of each call partner is displayed.

In step 405, after displaying the POC contact list, the MPU 200 checks whether a call partner is selected by the user. The user can select a group for a group call or one partner for a one-to-one call. Hereinafter, it is assumed that the group call is selected. In step 407, when the call partner is selected, the MPU 200 displays the selected call partners (members of the selected group).

In step 409, the MPU 200 checks whether the POC call is initiated. The POC call initiation can be detected by a user's press of the POC button. In step 411, when the POC call is initiated, the MPU performs a POC call mode. During the POC call mode, the mobile communication terminal can operate as a talker having a right to speak or a listener having no right to speak.

In step 413, the MPU 200 checks whether an urgent message transmission key is inputted during the POC call mode. The urgent message transmission key can be implemented with a soft key that is displayed on a screen. In step 415, when the urgent message transmission key is inputted, the MPU 200 displays a screen requesting a selection of a partner to whom an urgent message is to be transmitted. As one example, a screen requesting a selection of all call partners, a talker having a right to speak, or one of group call establishers can be displayed. As another example, a screen requesting a selection of one of the group call participants can be displayed.

In step 417, after displaying the screen requesting the selection of the partner, the MPU 200 checks whether the partner to whom the message is to be transmitted is selected. In step 419, when the partner is selected, the MPU 200 displays a message input window. In step 421, the MPU 200 checks whether an input of a message is completed. In step 423, when the input of the message is completed, the MPU 200 creates an SMS message using the input message. In step 425, the MPU 200 transmits the created SMS message to the selected partner. If a current traffic channel is allocated, the SMS message is transmitted over the corresponding traffic channel. On the contrary, if the traffic channel is in a dormant state, the SMS message can be transmitted over a common channel such as an access channel.

According to the present invention, since the SMS message can be transmitted during the POC call service (or the PTT call service), even a participant having no right to speak can inform other participants of his or her own state. That is, it is possible to solve the problem of the one-way communication that is inconvenient to a user who is accustomed to a two-way communication.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for transmitting a message during a PTT (Push To Talk) call service in a mobile communication terminal having no right to speak, the method comprising the steps of:
   performing a PTT call;
   checking whether a message transmission key is input during the PTT call, by the mobile communication terminal having no right to speak; and
   when the message transmission key is input, transmitting a stored message to at least one participant using a Short Message Service (SMS), by the mobile communication terminal having no right to speak,
   wherein transmitting the stored message during the PTT call includes transmitting the stored message to a network over a reverse common channel, and
   wherein transmitting the stored message during the PTT call further includes:
      when the message transmission key is input, displaying a screen requesting to select a participant to whom the message is to be transmitted;
      when the participant is selected, displaying a message input window; and
      when the input of a message is completed, creating the SMS message using the input message and transmitting the created SMS message to a selected participant.

2. The method of claim 1, wherein the step of transmitting the stored message during the PTT call further includes:
   displaying a list of messages;
   selecting one message from the list; and
   creating the SMS message using the selected message and transmitting the created SMS message to the at least one participant.

3. A method for transmitting a message during a PTT (Push To Talk) call service in a mobile communication terminal having no right to speak, the method comprising the steps of:
   performing a PTT call;
   checking whether a message transmission key is input during the PTT call, by the mobile communication terminal having no right to speak; and when the message transmission key is input, transmitting a stored message to all participants using a Short Message Service (SMS), by the mobile communication terminal having no right to speak, wherein transmitting the stored message includes transmitting the stored message to a network over a reverse common channel.

4. The method of claim 3, wherein the step of transmitting the stored message during the PTT call further includes:

displaying a list of messages;

selecting one message from the list; and creating the SMS message using the selected message and transmitting the created SMS message to all participants.

5. A method for transmitting a message during a PTT (Push To Talk) call service in a mobile communication terminal having no right to speak, the method comprising the steps of:

displaying a soft key on a screen so as to select a message transmission during the PTT call service, by the mobile communication terminal having no right to speak;

when the soft key is input, displaying a list of preset messages, by the mobile communication terminal having no right to speak; and when one message is selected from the list, creating a Short Message Service (SMS) message using the selected message and transmitting the created SMS message to a PTT participant with a right to speak, by the mobile communication terminal having no right to speak, wherein transmitting the stored message includes transmitting the stored message to a network over a reverse common channel.

6. A method for transmitting a message during a PTT (Push To Talk) call service in a mobile communication terminal having no right to speak, the method comprising the steps of:

displaying a soft key on a screen so as to select a message transmission during the PTT call service, by the mobile communication terminal having no right to speak;

when the soft key is input, checking whether a PTT participant to whom a message is to be transmitted is selected from among all PTT participants, by the mobile communication terminal having no right to speak;

when the PTT participant is selected, receiving an input of a message, by the mobile communication terminal having no right to speak; and when the input of the message is completed, creating a Short Message Service (SMS) message using the input message and transmitting the created SMS message to the selected PTT participant, by the mobile communication terminal having no right to speak, wherein transmitting the stored message includes transmitting the stored message to a network over a reverse common channel.

\* \* \* \* \*